United States Patent
Born et al.

(10) Patent No.: US 10,258,966 B2
(45) Date of Patent: Apr. 16, 2019

(54) CATALYST GAUZE AND INSTALLATION FOR THE CATALYTIC OXIDATION OF AMMONIA

(71) Applicant: Umicore AG & Co. KG, Hanau (DE)

(72) Inventors: Dirk Born, Biebergemünd (DE); Dietmar Königs, Gelnhausen (DE); Christian Goerens, Hattersheim (DE)

(73) Assignee: UMICORE AG & CO. KG, Hanau (DE)

(*) Notice: Subject to any disclaimer, the term of this patent is extended or adjusted under 35 U.S.C. 154(b) by 0 days.

(21) Appl. No.: 15/549,702

(22) PCT Filed: Jan. 19, 2016

(86) PCT No.: PCT/EP2016/051006
§ 371 (c)(1),
(2) Date: Aug. 9, 2017

(87) PCT Pub. No.: WO2016/128184
PCT Pub. Date: Aug. 18, 2016

(65) Prior Publication Data
US 2018/0029014 A1    Feb. 1, 2018

(30) Foreign Application Priority Data
Feb. 12, 2015   (EP) .................................. 15154849

(51) Int. Cl.
| | |
|---|---|
| *B01J 19/24* | (2006.01) |
| *B01J 23/44* | (2006.01) |
| *B01J 35/06* | (2006.01) |
| *C01B 21/26* | (2006.01) |
| *B01J 23/40* | (2006.01) |

(Continued)

(52) U.S. Cl.
CPC .......... *B01J 23/44* (2013.01); *B01J 19/2495* (2013.01); *B01J 23/40* (2013.01); *B01J 23/42* (2013.01); *B01J 23/464* (2013.01); *B01J 35/06* (2013.01); *C01B 21/267* (2013.01); *B01J 2219/30257* (2013.01); *B01J 2219/30261* (2013.01); *B01J 2219/30475* (2013.01); *B01J 2523/00* (2013.01)

(58) Field of Classification Search
CPC ........ B01J 19/2495; B01J 23/42; B01J 23/44; B01J 23/464; C01B 21/28; C01B 21/265; C01B 21/267
See application file for complete search history.

(56) References Cited

FOREIGN PATENT DOCUMENTS

| EP | 0504723 | 9/1992 |
|---|---|---|
| RU | 2119819 C1 | 10/1998 |

(Continued)

OTHER PUBLICATIONS

International Search Report for PCT/EP2016/051006, dated Mar. 18, 2016.

*Primary Examiner* — Lessanework Seifu
(74) *Attorney, Agent, or Firm* — NK Patent Law

(57) ABSTRACT

Catalyst gauze (1) for the reduction of the amount of $N_2O$ in an ammonia oxidation process, containing a first layer (2) of woven or knitted first wire material (4), whereby said first wire material (4) is made from Pd or a Pd-rich alloy, whereby said first layer (2) contains a reinforcement in the form of a second wire material (5) which is woven or knitted among the first wire material (4) and which has a different composition than the first wire material (5).

15 Claims, 1 Drawing Sheet

Figure 1:
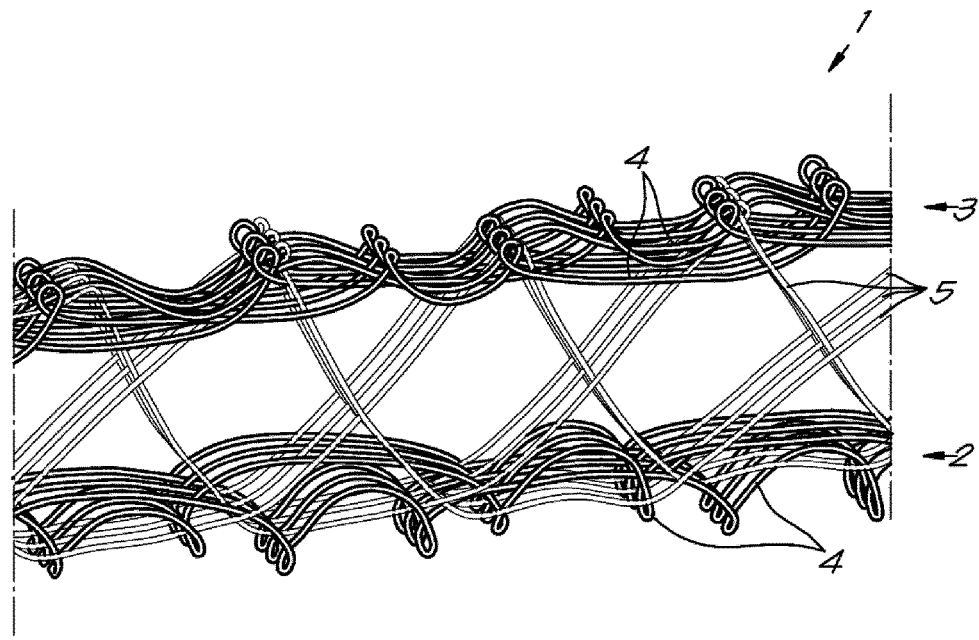

(51) Int. Cl.
    *B01J 23/42*        (2006.01)
    *B01J 23/46*        (2006.01)

(56)                References Cited

FOREIGN PATENT DOCUMENTS

| RU | 2205151 C1 |   | 5/2003  |
|----|------------|---|---------|
| WO | 8603479 A1 |   | 6/1986  |
| WO | 2001/87771 |   | 11/2001 |
| WO | 2004/096703 | * | 11/2004 |
| WO | 2010/046675 |   | 4/2010  |
| WO | 2010/046676 |   | 4/2010  |

\* cited by examiner

CATALYST GAUZE AND INSTALLATION FOR THE CATALYTIC OXIDATION OF AMMONIA

This application is a National Stage application of International Application No. PCT/EP2016/051006, filed Jan. 19, 2016. This application also claims priority to European Application No. EP15154849.2, filed Feb. 12, 2015.

The invention concerns a catalyst gauze and an installation for the catalytic oxidation of ammonia.

Ammonia oxidation to NO, an intermediate step in the manufacture of nitric acid, is usually performed in a reactor with catalyst gauzes. These catalyst gauzes are usually woven or knitted wires made from platinum or from an alloy of platinum with other precious metals as minor components.

During this process, $N_2O$ is produced as an undesired by-product. $N_2O$ is considered a very potent greenhouse gas, for which reason it is important to limit the production of $N_2O$ during ammonia oxidation.

It is known from WO01/87771 that catalyst gauzes made from Pd or Pd-rich wire used downstream of a traditional Pt-based catalyst gauze may be used to reduce the amount of $N_2O$ produced. This probably works by dissociation of $N_2O$ molecules.

Such Pd-based catalyst gauzes are however mechanically relatively weak, which means that they can develop breaks during use, which will obviously cause a part of the $N_2O$ to bypass the Pd-based catalyst gauze without contact with the catalytically active metal. For this reason, the $N_2O$ level will increase during the period of use, so that such Pd-based catalyst gauzes have a limited technical life, and may even require the shutdown of an ammonia oxidation plant to replace the catalyst gauzes.

As Pd and other precious metals are very expensive, it is economically unattractive to make the Pd-based catalyst gauzes from thicker, and therefore stronger, wire, or to use more wire to make a stronger catalyst gauze. In addition, this is technically unattractive because of increasing pressure drop with increasing wire diameter, which would be a disadvantage for the overall efficiency of the process. The optimisation, for a given catalytic activity, of gauze strength and amount of material used is therefore very important for Pd-based catalyst gauzes.

A further problem that occurs during ammonia oxidation is that several Pd-based catalyst gauzes are used, one after the other, and that they may fuse together during use.

This reduces the overall height, in other words the dimension in the direction of the gas flow, so that the contact time of the gasses with the Pd-based catalyst gauzes is reduced during use and thereby the performance of the catalyst gauzes. Furthermore, this causes again the pressure drop in the reactor to rise, which reduces the production capacity of the reactor and/or increases the forces upon the Pd-based catalyst gauzes.

The formation of breaks, as well as collapse of the height, are usually not uniformly distributed over the entire Pd-based catalyst gauze.

Any negative effect that is not uniformly distributed will have a disproportionate overall effect, as the local deviations from the average, for instance a higher than average local pressure drop or local temperature, form critical points where further deviation is accelerated, possibly leading to catastrophic failure, e.g. ammonia slippage due to bad flow distribution with a preferred flow at a certain point of the gauze.

The present invention aims to solve or reduce the above-mentioned and other problems by providing a catalyst gauze for the reduction of the amount of $N_2O$ that is produced in an ammonia oxidation process, containing a first layer of woven or knitted first wire material, whereby said first wire material is made from Pd or a Pd-rich alloy, whereby said first layer contains a reinforcement in the form of a second wire material which is woven or knitted among the first wire material and which has a different composition than the first wire material.

The first and second wire material may be present as a single long strand or a very limited number of longs strand of wire, or may be several, or even many, shorter lengths of wire.

Preferably, the first layer is a knitted layer.

A Pd-rich alloy is intended to mean an alloy with 50 wt % or more Pd. For instance, the first wire material is made from an alloy with at least 75.0 wt % Pd.

Preferably, the first wire material is made from an alloy with more than 80.0 wt % and less than 82.0 wt % Pd. More preferably, the first wire material is made from a Pd—Pt—Rh alloy with at least 80.0 wt % Pd and at least 10.0 wt % Pt.

The advantage of the invention is that the second wire material forms a reinforcement of the Pd-based mechanical structure.

In that context, the second wire material is a second reinforcement wire material which is woven or knitted among the first wire material making the catalyst gauze mechanically stronger during operation or use and therefore allowing it to be used longer, or allowing, for the same projected use, a reduction in the amount of precious metals that needs to be used. The composition of the second wire can be chosen such that it can optimally exercise its reinforcement function.

In a preferred embodiment, the second wire material is made from Pt or a Pt-rich alloy and preferably a Pt—Rh alloy with 1-10% Rh.

This is much stronger than the Pd-based first wire material, and additionally has further catalytic activity for the desired ammonia oxidation to NO.

Stated alternatively, such Pt or Pt-rich second wire material is in the invention used synergetically to provide reinforcement to the Pd-based first layer.

In a further preferred embodiment the catalyst gauze contains a second layer of woven or knitted third wire material, whereby said third wire material is made from Pd or a Pd-rich alloy, whereby said second layer also contains the second wire material which is woven or knitted, preferably knitted, among the third wire material and whereby preferably the second wire material is binding together the first and second layer.

The presence of the second wire will not only make the catalyst gauze stronger than would otherwise be the case but will also reduce the tendency of the two layers to fuse, thereby maintaining a longer period of high performance.

Also, a single multi-layer catalyst gauze is easier to install in and remove from the reactor than two or more single-layer catalyst gauzes.

In a particular embodiment, the summed weight percentage of the first wire material and the third wire material is between 33 and 67 wt %, and preferably between 45 and 65 wt %.

Preferably the second wire material is disposed in loops which extend outside the first layer, so that at least 50 wt % of the second wire material is disposed outside the first layer, and more preferably the first layer and second layer are disposed parallel, whereby the second wire material is present as pile threads which run back and forth between the first layer and the second layer so that some distance is created by the first layer and the second layer, further reducing the tendency of these layers to fuse.

Additionally, this distance is uniform over the entire catalyst gauze, so that local deviations are avoided, further contributing to a long-term good performance.

In a further preferred embodiment, the first wire material and the third wire material have the same composition, and preferably the same thickness. Preferably, the layers are both knitted layers with the same geometric structure. This eases the manufacturing of the catalyst gauze.

In a further preferred embodiment, the second wire material, in the part of the catalyst gauze between the first and the second layer, is disposed at an angle or angles to the plane defined by the first layer, whereby this angle or these angles are between 30° and 90°, and preferably between 40° and 90°. This way, the second wire material between these two layers is partly or completely parallel to the gas flow, thereby having only a limited effect on the pressure drop.

The angle is hereby considered the smallest angle between the plane defined by the first layer and the average direction of the second wire between the first and the second layer.

The invention also covers an installation for the catalytic oxidation of ammonia to NO, comprising at least one catalyst gauze made from Pt or Pt-rich wire material having at least 70 wt % Pt and comprising, downstream from said catalyst gauze, a catalyst gauze according to the invention.

Figure 2:
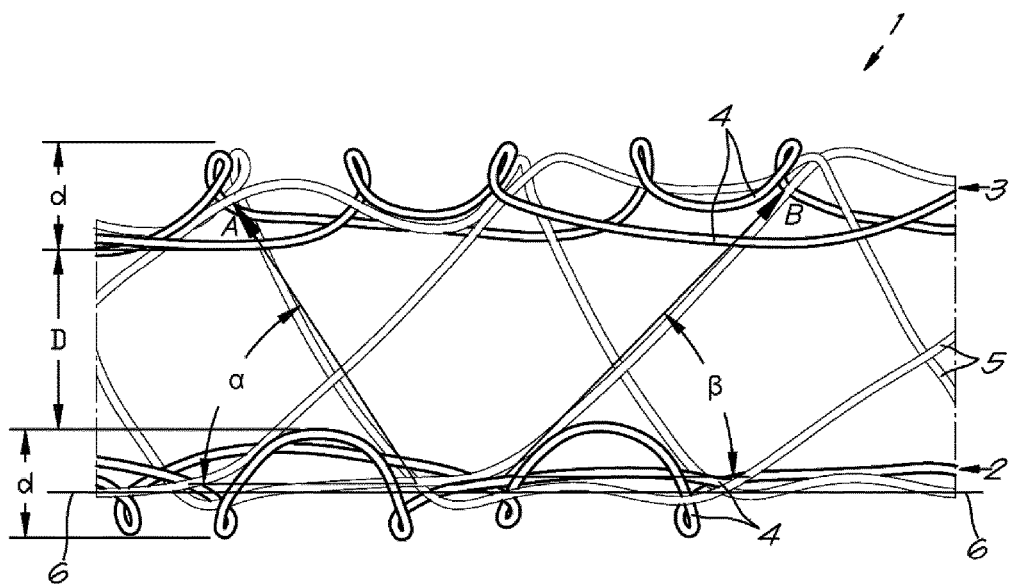

In order to explain the invention a non-limiting example of a specific embodiment of a catalyst gauze according to the invention and its use is given below, with reference to the following figures:

FIG. 1, which shows a perspective view of the structure of a catalyst gauze, whereby for clarity only a few stitches are shown, and FIG. 2, which shows a side view of the structure of the catalyst gauze of FIG. 1.

The catalyst gauze 1 of the figures mainly consists of two layers, more specifically a first layer 2 and a second layer 3 which are both knitted.

The first layer 2 is made from a first wire 4 with, in this example but not necessarily, a diameter of 0.076 mm, made from an alloy having a composition 81.5 wt % Pd, 15 wt % Pt and 3.5 wt % Rh. The second layer 3 is, in this example but not necessarily, made from the same wire material as the first layer 2.

The first layer 2 and second layer 3 have a thickness d of circa 0.55 mm and are placed at a distance D of circa 1.4 mm, giving an overall thickness D+2d of 2.5 mm.

In between the stitches of the knitted wires 4 of the first layer 2 and second layer 3 a pile thread 5 is provided, that runs back and forth between the first layer 2 and the second layer 3. This pile thread 5 is made from a second wire with, in this example but not necessarily, a diameter of 0.07 mm and made from an alloy with a composition of 95 wt % Pt and 5 wt % Rh.

In general the wire diameters of the first and second wire may range from 0.06 mm to 0.105 mm, but may exceptionally also be outside this range, In order to make the difference between both types of wire clear, the pile thread 5 is indicated in the figures with thin lines, and the first wire 4 is indicated with thicker lines.

The pile thread 5, in the part of the catalyst gauze 1 between the first layer 2 and the second layer 3, makes two average directions with the geometrical plane 6 in which the first layer 2 extends, indicated by A and B. These directions A, B make a smallest angle α, respectively β of circa 60° respectively circa 45° with the geometrical plane 6 in which the first layer 2 extends.

Note that FIG. 2 is a side view in the direction in which angles α and β are minimal. In all other side views these angles α and β will appear larger.

The weight of the first wire 4 used for both the first layer 2 and the third layer 3 is 48% of the total weight of the catalyst gauze 1 and the weight of the pile thread/second wire 5 is 52% of the total weight of the catalyst gauze 1. The total weight of the catalyst gauze 1 is circa 1220 g/m².

A catalyst gauze 1 as described above may be manufactured on commercially available industrial flat-bed knitting machines. In accordance with EP0504723 the setting on the flat-bed knitting machine are preferably between about 3.63 mm and about 0.81 mm with respect to gauge and between 2 and 6 mm for the mesh length.

The tensile strength of a strip of the catalyst gauze 1 was measured and compared with two mutually identical strips placed on top of each other of a knitted catalyst gauze not according to the invention and made from only the first wire 4, having a total weight of 770 g/m2

All test pieces had a width of 50 mm and were heat treated before testing for 0.5 hrs at 1000° C. in air to simulate aging during use. The results were as follows:

| Material | Tensile strength (N) | Tensile strength per mass unit of first wire (N/(g/m²)) |
|---|---|---|
| Gauze 1 according to the invention | 199.4 | 0.341 |
| Comparative test piece | 187.5 | 0.244 |

The results show that for the same amount of first wire 4, the catalyst gauze 1 according to the invention, is circa 40% stronger than a traditional knitted Pd rich catalyst gauze and will therefore have longer life and more stable operating conditions.

The catalyst gauze 1 was tested for its catalytic properties as follows:

A test reactor was used with an effective diameter of 22 cm. In this test reactor, the following catalyst gauzes were installed, in order:

A standard knitted catalyst gauze made of wires of 0.076 mm diameter of Pt+5 wt % Rh alloy with total weight of 600 g/m2

A catalyst gauze 1 according to the invention as described above

Two further catalyst gauzes which were the same as in the first position

A catalyst gauze with the same geometry as the catalyst gauze in the first position, but made from Pd alloy with 15 wt % Pt and 3.5 wt % Rh.

Two further catalyst gauzes which were the same as in the first position

The bed of catalyst gauzes was heated to 890° C. The reactor was operated at 5.0 bar absolute pressure.

A feed of 29.6 kg/h NH₃ in the form of a 10.20% NH₃ mixture in air was supplied to the bed of catalyst gauzes. The N₂O content was determined after certain times on stream, and was as follows:

|  | Days | | | | | |
| --- | --- | --- | --- | --- | --- | --- |
|  | 2 | 3 | 5 | 7 | 9 | 12 |
| N$_2$O (ppm) | 280 | 265 | 330 | 335 | 355 | 360 |

Note that the N$_2$O content was determined after bringing the O$_2$ content to 0%.

The selectivity to NO of the oxidation reaction, determined after 9 days, was 93.4%.

The invention claimed is:

1. A catalyst gauze for the reduction of the amount of N$_2$O in an ammonia oxidation process, the gauze comprising a first layer, the first layer comprising:
   a woven or knitted first wire material, wherein said first wire material comprises Pd or a Pd-rich alloy, and
   a second wire material, which is woven or knitted among the first wire material thereby reinforcing the first layer, wherein the second wire material has a different composition than the first wire material and wherein the second wire material is disposed in loops which extend outside the first layer, such that at least 50 wt % of the second wire material is disposed outside the first layer.

2. Catalyst gauze of claim 1, wherein the second wire material comprises Pt or a Pt-rich alloy.

3. Catalyst gauze of claim 2, wherein the second wire material comprises a Pt—Rh alloy with 1-10% Rh.

4. Catalyst gauze of claim 1, wherein the first layer is a knitted layer.

5. Catalyst gauze of claim 1, wherein the first wire material comprises an alloy with at least 75.0 wt % Pd.

6. Catalyst gauze of claim 1, wherein the first wire material comprises a Pd—Pt—Rh alloy with at least 80.0 wt % Pd and at least 10.0 wt % Pt.

7. Catalyst gauze of claim 1, wherein the first wire material comprises an alloy with more than 80.0 wt % and less than 82.0 wt % Pd.

8. An installation for the catalytic oxidation of ammonia to NO, comprising a first catalyst gauze comprising a Pt or Pt-rich wire material having at least 70 wt % Pt and, downstream from said first catalyst gauze, a second catalyst gauze, wherein the second catalyst gauze comprises the catalyst gauze of claim 1.

9. A catalyst gauze for the reduction of the amount of N$_2$O in an ammonia oxidation process, the gauze comprising a first layer and a second layer, the first layer comprising:
   a woven or knitted first wire material, wherein said first wire material comprises Pd or a Pd-rich alloy, and
   a second wire material, which is woven or knitted among the first wire material thereby reinforcing the first layer, wherein the second wire material has a different composition than the first wire material, and
the second layer comprising:
   a woven or knitted third wire material, wherein said third wire material comprises a Pd or a Pd-rich alloy, and
   the second wire material, which is woven or knitted among the third wire material.

10. Catalyst gauze of claim 9, wherein the second layer is a knitted layer and the first wire material and the third wire material have the same composition.

11. Catalyst gauze of claim 9, wherein the first layer and second layer are disposed parallel, and the second wire material is present as a pile thread, which runs back and forth between the first layer and the second layer.

12. Catalyst gauze of claim 9, wherein the second wire material, in the part of the catalyst gauze between the first layer and the second layer, is disposed at an angle or angles ($\alpha,\beta$) to a plane defined by the first layer, wherein the angle or angles ($\alpha,\beta$) are between 30° and 90°.

13. Catalyst gauze of claim 9, wherein the second layer is a knitted layer.

14. Catalyst gauze of claim 9, wherein the summed weight percentage of the first wire material and the third wire material is between 33 and 67 wt %.

15. An installation for the catalytic oxidation of ammonia to NO, comprising a first catalyst gauze comprising a Pt or Pt-rich wire material having at least 70 wt % Pt and, downstream from said first catalyst gauze, a second catalyst gauze, wherein the second catalyst gauze comprises the catalyst gauze of claim 9.

* * * * *